(12) United States Patent
Sopchak et al.

(10) Patent No.: US 7,776,479 B2
(45) Date of Patent: Aug. 17, 2010

(54) MICRO-ELECTRO-MECHANICAL SYSTEMS PHOSPHORIC ACID FUEL CELL

(75) Inventors: David A. Sopchak, Livermore, CA (US); Jeffrey D. Morse, Martinez, CA (US); Ravindra S. Upadhye, Pleasanton, CA (US); Jack Kotovsky, Oakland, CA (US); Robert T. Graff, Modesto, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1509 days.

(21) Appl. No.: 11/119,525

(22) Filed: Apr. 28, 2005

(65) Prior Publication Data

US 2005/0260485 A1   Nov. 24, 2005

Related U.S. Application Data

(60) Provisional application No. 60/566,759, filed on Apr. 29, 2004.

(51) Int. Cl.
*H01M 8/00*  (2006.01)

(52) U.S. Cl. .................. 429/400; 429/428; 429/477
(58) Field of Classification Search ............... 429/12, 429/13, 400, 428, 477
See application file for complete search history.

(56) References Cited

U.S. PATENT DOCUMENTS

| | | | |
|---|---|---|---|
| 4,463,067 A * | 7/1984 | Feigenbaum | 429/34 |
| 6,703,152 B2 | 3/2004 | Komiya et al. | |
| 6,833,204 B2 | 12/2004 | Oyanagi et al. | |
| 6,835,488 B2 * | 12/2004 | Sasahara et al. | 429/39 |
| 2002/0012822 A1 | 1/2002 | Oyanagi et al. | |
| 2002/0012823 A1 | 1/2002 | Komiya et al. | |
| 2002/0028372 A1 | 3/2002 | Ohlsen et al. | |
| 2002/0041991 A1 | 4/2002 | Chan et al. | |
| 2003/0044674 A1 | 3/2003 | Mallari et al. | |
| 2004/0009377 A1 | 1/2004 | Iguchi | |

* cited by examiner

*Primary Examiner*—Jane Rhee
(74) *Attorney, Agent, or Firm*—Eddie E. Scott; John H. Lee

(57) ABSTRACT

A phosphoric acid fuel cell system comprising a porous electrolyte support, a phosphoric acid electrolyte in the porous electrolyte support, a cathode electrode contacting the phosphoric acid electrolyte, and an anode electrode contacting the phosphoric acid electrolyte.

5 Claims, 9 Drawing Sheets

MICRO-ELECTRO-MECHANICAL SYSTEMS PHOSPHORIC ACID FUEL CELL

CROSS-REFERENCE TO RELATED APPLICATIONS

This application claims the benefit of U.S. Provisional Patent Application No. 60/566,759 filed Apr. 29, 2004 and titled "A MEMS Based Phosphoric Acid Fuel Cell (PAFC) and Methods Thereof." U.S. Provisional Patent Application No. 60/566,759 filed Apr. 29, 2004 and titled "A MEMS Based Phosphoric Acid Fuel Cell (PAFC) and Methods Thereof" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to phosphoric acid fuel cells and more particularly to electromechanical systems phosphoric acid fuel cells.

2. State of Technology

U.S. Pat. No. 6,833,204 to Hiroyuki Oyanagi et al, assigned to Honda Giken Kogyo Kabushiki Kasha, issued Dec. 21, 2004; as well as U.S. Pat. No. 6,703,152 and United States Patent Applications Nos. 20040009377, 20020012823, and 20020012822; provide the following state of technology information: "The phosphoric acid fuel cell has a power-generating cell which is provided with an electrolyte-electrode assembly comprising an anode electrode, a cathode electrode, and an electrolyte layer interposed between the both electrodes. The electrolyte layer is generally constructed such that pores of a porous silicon carbide member is impregnated with concentrated phosphoric acid (liquid electrolyte). However, another type of the electrolyte layer is also known, in which a membrane of basic polymer such as polybenzimidazole is impregnated with phosphoric acid or sulfuric acid (see U.S. Pat. No. 5,525,436). In the phosphoric acid fuel cell, a predetermined number of the power-generating cells are electrically connected in series with each other to provide a fuel cell stack which is accommodated in a container. When the phosphoric acid fuel cell is operated, at first, the hydrogen-containing gas is supplied to the anode electrode, and the oxygen-containing gas is supplied to the cathode electrode.

The hydrogen in the hydrogen-containing gas is ionized on the anode electrode in a manner as represented by the following reaction formula (A). As a result, the hydrogen ion and the electron are generated.

$$2H_2 \rightarrow 4H^+ + 4e \qquad (A)$$

The hydrogen ion is moved toward the cathode electrode via the electrolyte layer. On the other hand, the electron is extracted by an external circuit which is electrically connected to the anode electrode and the cathode electrode. The electron is utilized as the DC electric energy to energize the external circuit, and then it arrives at the cathode electrode. The hydrogen ion moved to the cathode electrode and the electron arrived at the cathode electrode via the external circuit cause the reaction as represented by the following reaction formula (B) together with the oxygen in the oxygen-containing gas supplied to the cathode electrode.

$$O_2 + 4H^+ + 4e \rightarrow 2H_2O \qquad (B)$$

The reaction according to the reaction formula (B) is slow as compared with the reaction formula (A). That is, the reaction represented by the reaction formula (B) constitutes the rate-determining step in the overall cell reaction of the phosphoric acid fuel cell."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a phosphoric acid fuel cell system comprising a porous electrolyte support, a phosphoric acid electrolyte in the porous electrolyte support, a cathode electrode contacting the phosphoric acid electrolyte, and an anode electrode contacting the phosphoric acid electrolyte. The fuel cell system is ideally suited, both thermally and chemically, for operation in conjunction with a methanol reformer. The phosphoric acid fuel cell system can operate from 150° to 250° C. The phosphoric acid fuel cell system comprises less individual parts than conventional fuel cell systems, and has other advantageous properties as well; including very high surface areas, very thin membranes and membrane electrode assemblies. The phosphoric acid fuel cell system is produced by the steps of providing a porous electrolyte support, filling the porous electrolyte support with a phosphoric acid electrolyte, positioning a cathode electrode in contact with the phosphoric acid electrolyte, and positioning an anode electrode contacting the phosphoric acid electrolyte. In one embodiment of the present invention the step of filling the porous electrolyte support with a phosphoric acid electrolyte comprises wicking the phosphoric acid electrolyte into the porous electrolyte support by capillary action.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
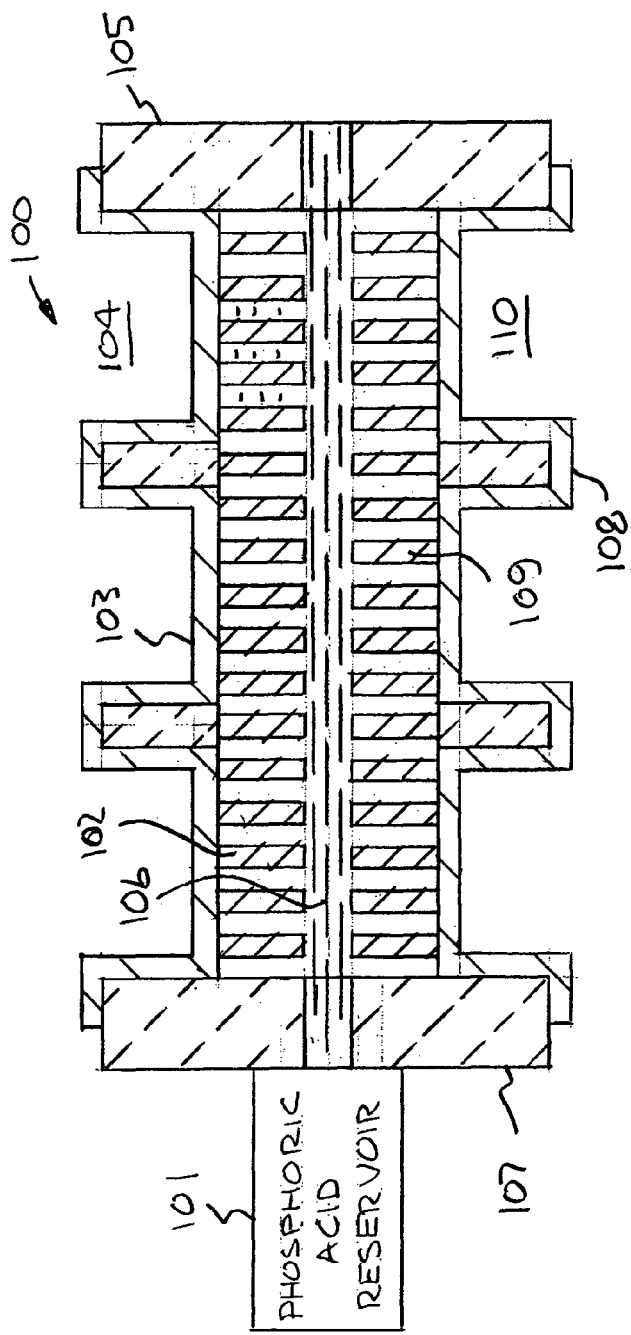
FIG. 1 illustrates one embodiment of a phosphoric acid fuel cell constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Figure 3:
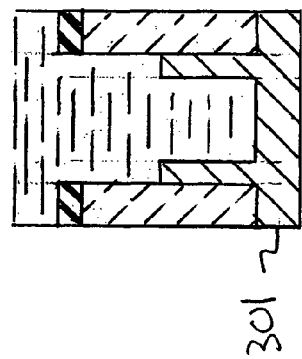
FIG. 3 shows an alternative version of the enlarged view of a section of the phosphoric acid fuel cell shown in FIG. 1.
Figure 2:
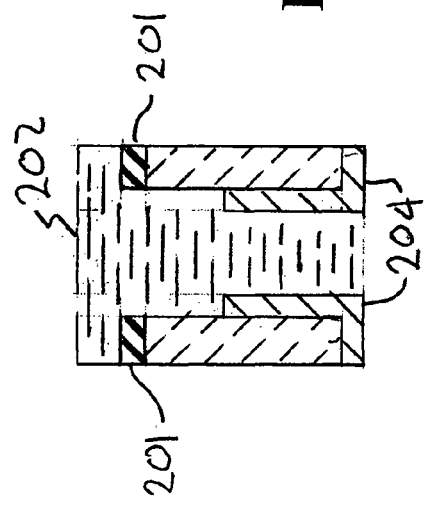
FIG. 2 shows an enlarged view of a section of the phosphoric acid fuel cell shown in FIG. 1.

Referring now to FIGS. 1, 2, and 3, one embodiment of a phosphoric acid fuel cell (PAFC) constructed in accordance with the present invention is illustrated. The PAFC is identified generally by the reference numeral 100. The PAFC 100 is produced utilizing different methods of manufacture, particularly MicroElectroMechanical Systems (MEMS) technology. The PAFC 100 includes the following structural components: phosphoric acid reservoir 101, high surface area silicon micropores 102, porous cathode electrode 103, cathode flow fields 104, silicone substrate 105, phosphoric acid electrolyte 106, silicone substrate 107, porous anode electrode 108, high surface area silicon micropores 109, and anode flow fields 110.

Referring now to FIG. 2, an enlarged view of a section of the PAFC 100 is shown. The enlarged section includes electric insulation (oxide) 201, electrolyte, 202, silicon 203, and electrode with catalyst 204. Referring now to FIG. 3, an alternative version of the enlarged view of a section of the PAFC 100 is shown. The alternative version enlarged section includes porous electrode with catalyst 301.

The structural components of the PAFC 100 having been described and illustrated in FIG. 1, FIG. 2, and FIG. 3, the construction and operation of the PAFC 100 will now be described. Included is a discussion of the forming of electrodes 103 and 108, high surface area silicon micropores 103 and 109, and associated anode flow field 110 and cathode flow field 104 in an integrated platform. A 0.5 mm wafer of <100> n+ silicon, resistivity approximately 1 milliohm-cm, is anisotropically etched from one side to create a suitable flow field to a depth of up to approximately 425 microns. The other side of the wafer is masked and etched with a high density matrix of pores, up to about several microns across, or possibly up to many tens of microns in diameter, width and aspect ratio of up to about 20, until the pores break through to the other side to the flow field microchannels. The pores are etched by various deep anisotropic etching techniques, including plasma etch, wet chemical etch, laser machining, electrochemical, or photo-electrochemical etching. The phosphoric acid electrolyte 106 is added to the edge of the porous matrix and is wicked in by capillary action to form a membrane-electrode-assembly. This membrane-electrode-assembly (MEA) is then fitted between two flow fields with a sealing gasket around the edge.

The PAFC 100 is ideally suited, both thermally and chemically, for operation in conjunction with a methanol reformer. PFACs can operate from 150° to 250° C. Above 150° C., the kinetics of carbon monoxide turnover on the fuel cell electrode become favorable, and the presence of one percent carbon monoxide in the fuel stream does not significantly degrade performance. Furthermore, PAFCs do not require humidification of their gas streams for good performance eliminating the necessity for a tight operating window.

Prior art PAFCs are comprised of several parts. At the center is a porous matrix which holds the phosphoric acid electrolyte. This is typically made of a sintered Teflon™/silicon carbide matrix tens of microns thick. The Teflon™/silicon carbide matrix is situated between two pieces of porous carbon fiber sheets, or gas diffusion layers (GDLs), which have had carbon supported platinum electrodes sprayed or screened onto one side. The electrodes and their supporting GDLs also contain a Teflon™ matrix created by the incorporation of Teflon™ particles into the GDLs during fabrication and subsequent sintering. This Teflon™ matrix maintains gas access to the catalyst sites by preventing the electrodes and GDLs from being completely flooded with phosphoric acid. The phosphoric acid electrolyte is added to the edge of the sintered frit and is wicked in by capillary action to form a membrane-electrode-assembly. This membrane-electrode-assembly (MEA) is then fitted between two flow fields with a sealing gasket around the edge. The flow fields are typically machined out of graphite because graphite has good corrosion resistance and electrical conductivity. In many cases flow fields are machined into both sides of a graphite plate, resulting in a bipolar plate. Electrolyte reservoirs may also be machined into the graphite plate. This technique results in about 5 to 7 pieces required per cell: one bipolar plate, one gasket, one electrolyte matrix, two GDL/electrode layers The PAFC 100 comprises less individual parts than conventional PAFCs. The PAFC 100 also has other advantageous properties than conventional PAFCs. The other advantageous properties include very high surface area, very thin membranes, and very thin membrane electrode assemblies.

Another approach of producing the PAFC 100 is electrochemical etching techniques that form a porous silicon matrix having random porosity. Examples of this include silica aerogel or solgel structures, anodized alumina, and sintered frits which can be attached to the silicon electrode structure. The electrolyte reservoir 101 is incorporated into this etch procedure as well. The "pore side" of the wafer is processed to give it an oxide or nitride (non-conducting) surface, while the flow field side is sputter coated with platinum or gold or other protective, conductive coating. Two of these wafers, placed with the insulating layers facing inward and with a small amount of phosphoric acid wicked between them and into the pores, will function as a PAFC if the conductive layer applied to them is platinum or other appropriate catalyst. Additionally, the catalyst or electrode layer may be a composite of Carbon with Pt or other catalyst mixed in. A fuel cell "stack," utilizing multiple cells placed back to back, can be made by placing a thin graphite or corrosion resistant metal sheet between opposing flow fields, thereby using the conductive silicon as the electrical conductor in a bipolar stack configuration.

Figure 4:
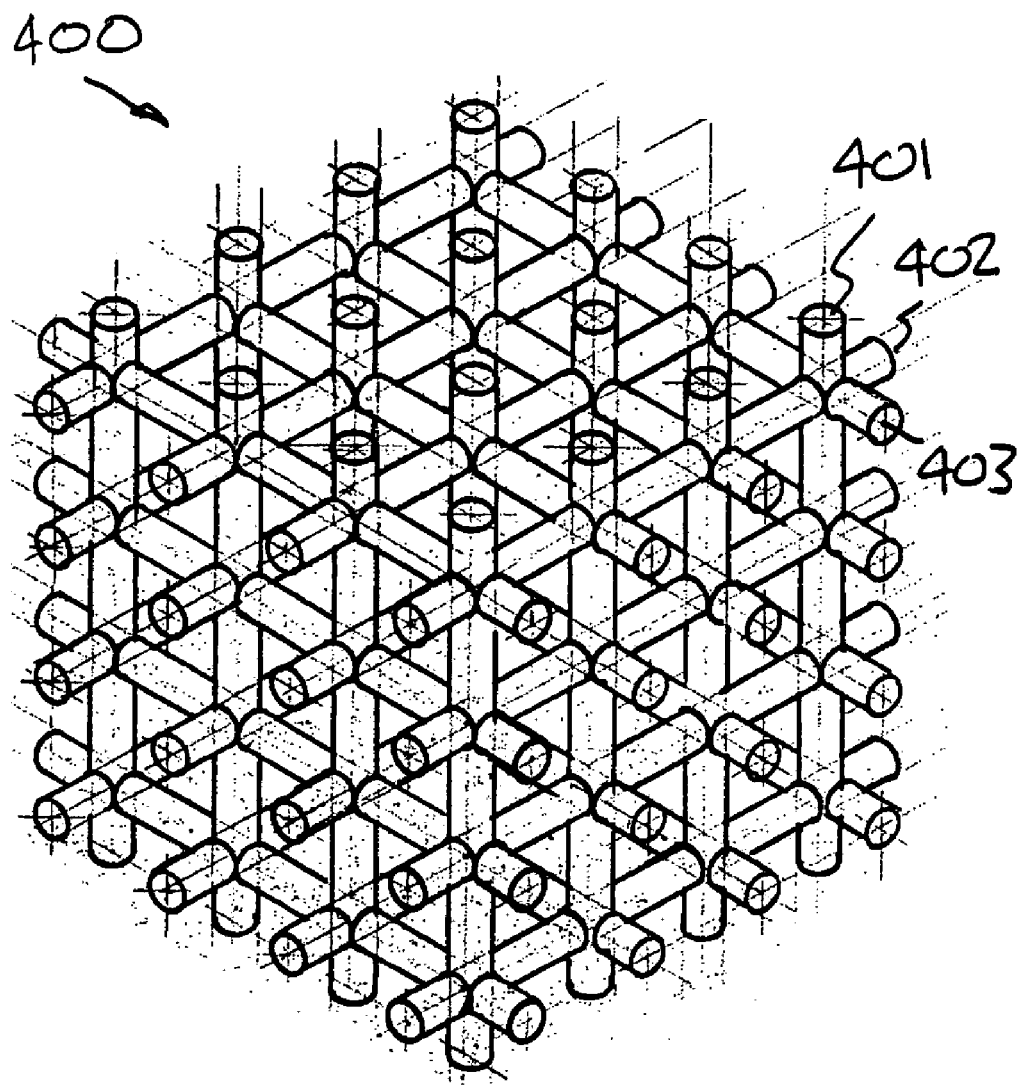
FIG. 4 shows a three dimensional "lattice" structure.

Another approach comprises a method that replaces the "pore side etch" with another high surface area open structure, such as dense arrays of posts, for example, or a three dimensional "lattice" structure. A three dimensional "lattice" structure is shown in FIG. 4. The three dimensional "lattice" structure is generally designated by the reference numeral 400. The three dimensional "lattice" structure 400 includes a lattice element 401 extending in the X axis, a lattice element 402 extending in the Y axis, and a lattice element 403 extending in the Z axis.

Figure 5:
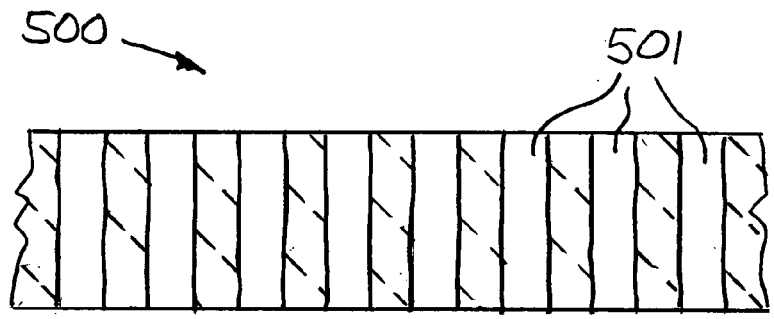
FIG. 5 shows a high aspect ratio micropore structure.

Referring now to in FIG. 5, a high aspect ratio micropore structure is shown. The high aspect ratio micropore structure is generally designated by the reference numeral 500. The high aspect ratio micropore structure 500 includes a micropore 501.

Figure 6:
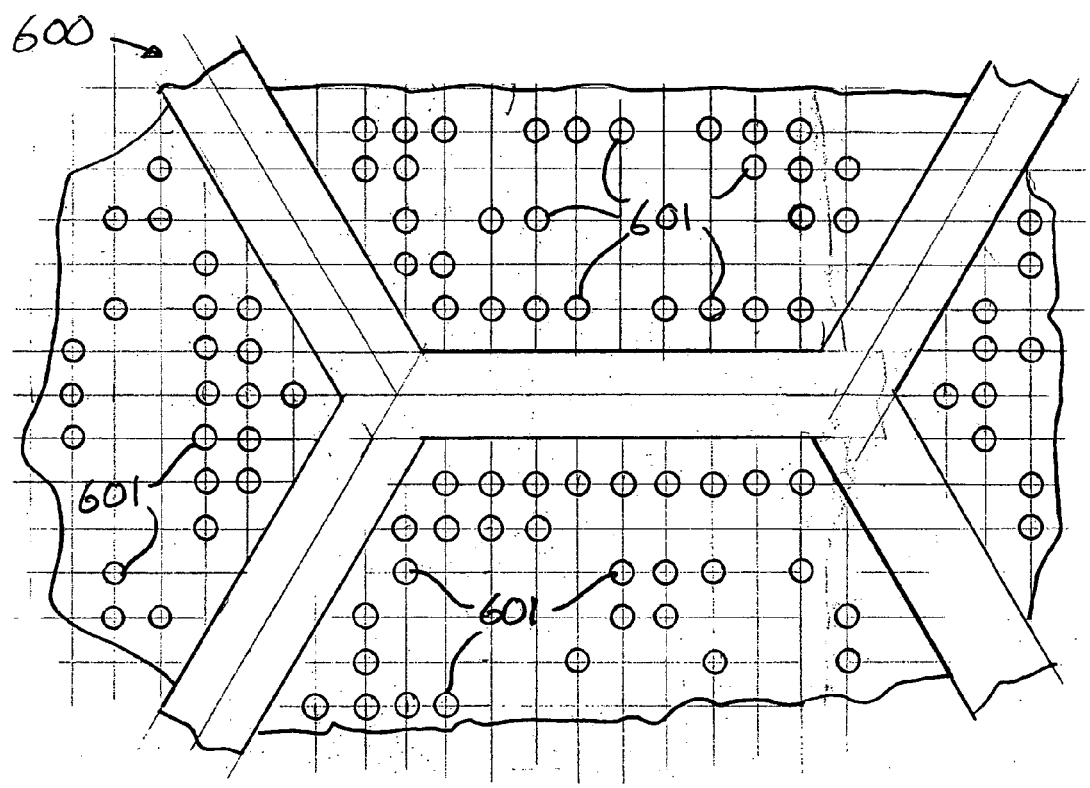
FIG. 6 shows an embodiment that includes arrays of micropores in a microchannel flow field.

Referring now to in FIG. 6, an embodiment of the present invention that includes arrays of micropores in a microchannel flow field is shown. The embodiment that includes arrays of micropores in a microchannel flow field is generally designated by the reference numeral 600. The micropores 601 provide a high surface area structure.

Figure 7:
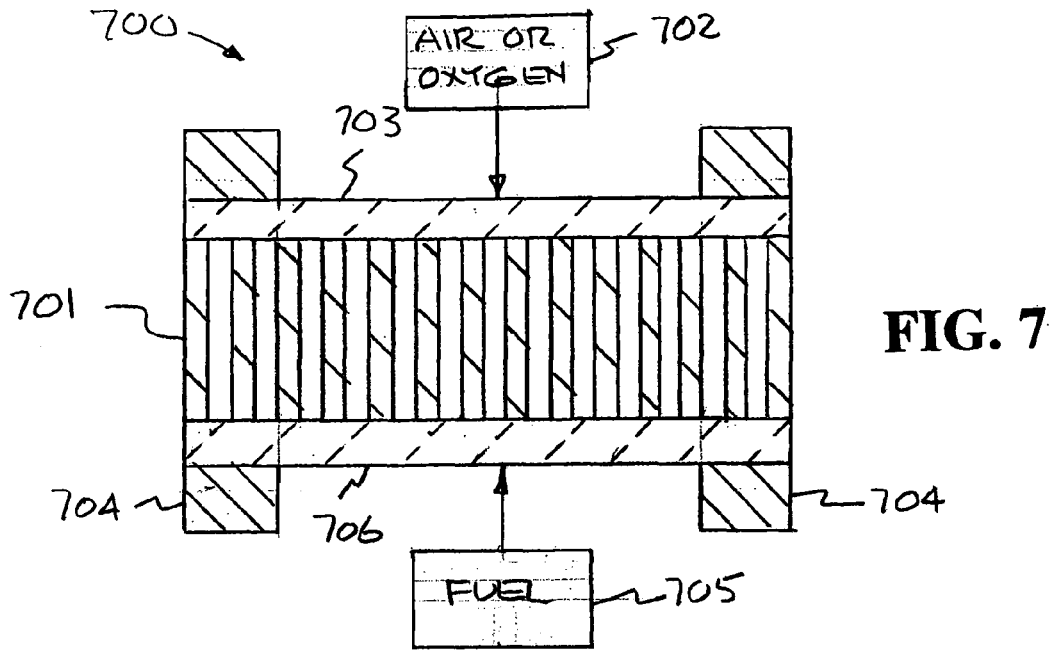
FIG. 7 illustrates another embodiment of a phosphoric acid fuel cell constructed in accordance with the present invention.

Referring now to FIG. 7, another embodiment of a PAFC constructed in accordance with the present invention is illustrated. The PAFC is identified generally by the reference numeral 700. The PAFC 700 includes the following structural components: a porous electrolyte support 701, air or oxygen 702, cathode 703, current carrying bus or manifold 704, fuel 705, and anode 706.

The structural components of the PAFC 700 having been described and illustrated in FIG. 7, the construction and operation of the PAFC 700 will now be described. The PAFC 700 utilizes any electrically insulating porous structure or layer as a structure 701 to hold the phosphoric acid, with electrodes 703 and 706 formed on opposing sides of the porous structure 701. Examples of this material include porous alumina, possibly formed through an anodization process, porous glass, polymers, anodized or insulated metals, porous silicon, aerogels, or other materials used to make frits and filters. The porous structure must wet to phosphoric acid to ensure the phosphoric acid electrolyte is retained in the support structure. This can further be achieved by chemical or coating processes to the porous materials. The porous structure is incorporated in a planar configuration as shown in FIG. 7.

Figure 8:
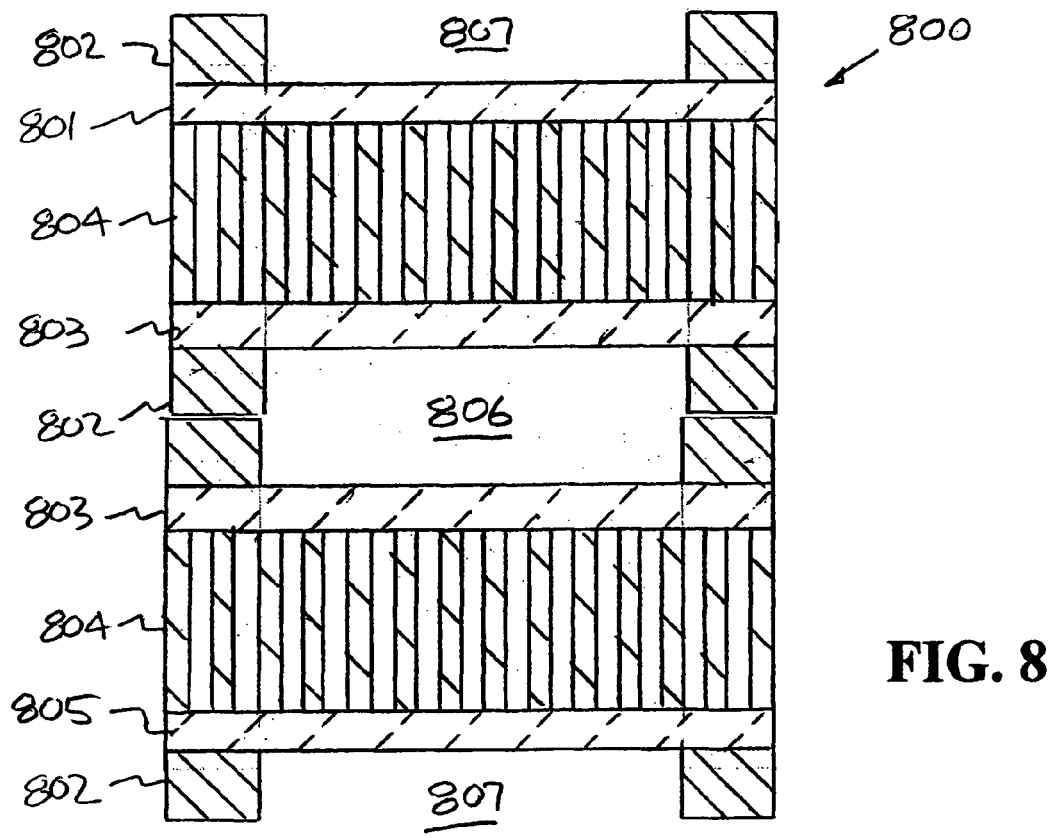
FIG. 8 illustrates another embodiment of a phosphoric acid fuel cell constructed in accordance with the present invention.

Referring now to FIG. 8, another embodiment of a PAFC constructed in accordance with the present invention is illustrated. The PAFC is identified generally by the reference numeral 800. The PAFC 800 includes the following structural components: upper fuel electrode 801, current collector 802, upper and lower air electrodes 803, upper and lower porous electrolyte supports 804, lower fuel electrode 805, air manifold or flow field 806, and fuel manifold or flow field 807. The porous structure is incorporated in a configuration as shown in FIG. 8, wherein current carrying electrodes are applied or a gas manifold can be used to stack the individual membrane electrode assemblies. The insulating electrolyte support layer may further be structured in such a manner as to increase overall surface area of the electrode, including cylindrical, serpentine, or other configurations. This can be accomplished by forming a mold in which a green state frit is placed, then sintered to hold the shape prior to depositing electrodes and electrolyte.

Figure 9:
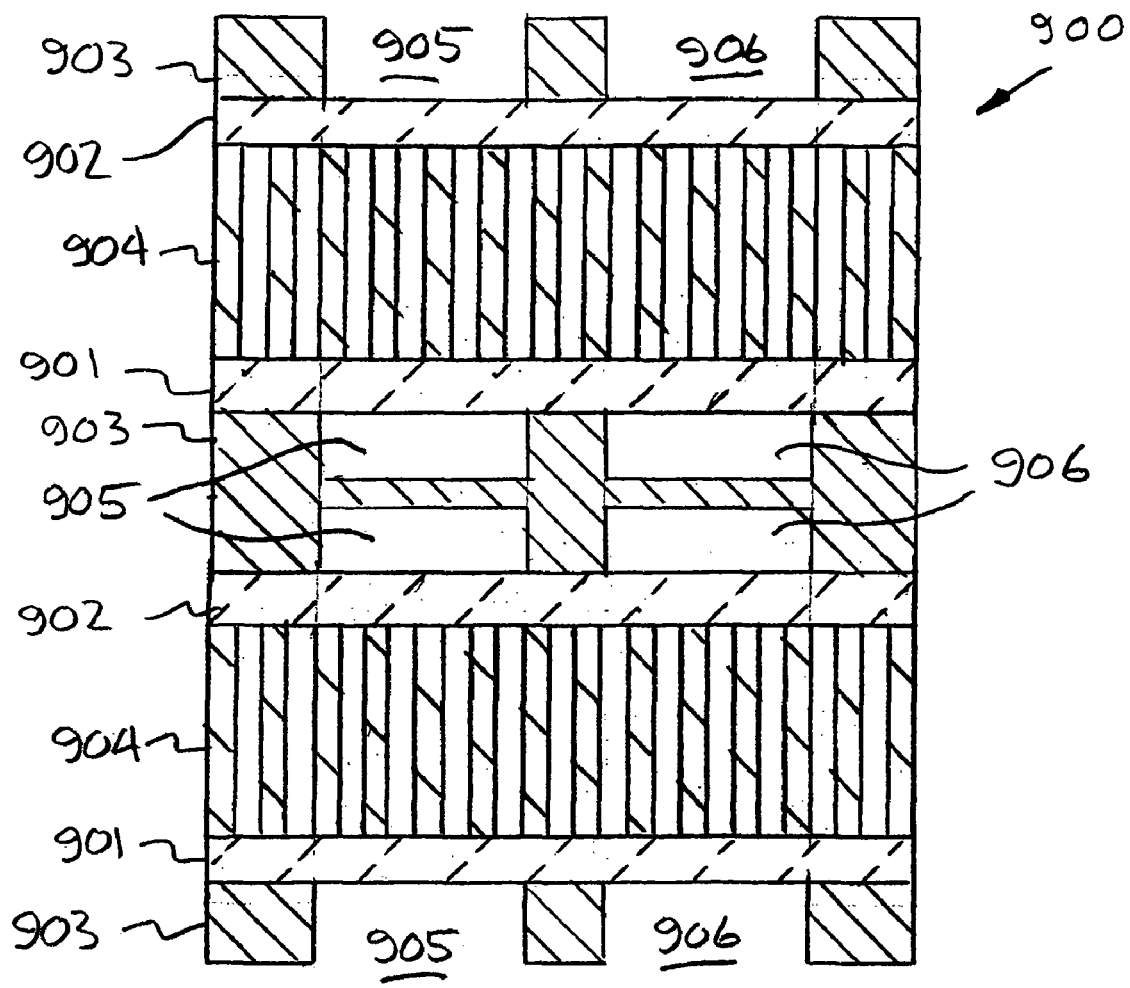
FIG. 9 illustrates a bipolar stack phosphoric acid fuel cell configuration.

Referring now to FIG. 9, another embodiment of a PAFC constructed in accordance with the present invention is illustrated. The PAFC is identified generally by the reference numeral 900. The PAFC 900 is a bipolar stack embodiment. The PAFC 900 includes the following structural components: fuel electrodes 901, air electrodes 902, current collector 903, porous electrolyte support 904, air manifold or flow field 905, and fuel manifold or flow field 906. The porous structure 904 is incorporated in a configuration as shown in FIG. 9, wherein current carrying electrodes are used to stack the individual membrane electrode assemblies. The insulating electrolyte support layer may further be structured in such a manner as to increase overall surface area of the electrode, including cylindrical, serpentine, or other configurations. This can be accomplished by forming a mold in which a green state frit is placed, then sintered to hold the shape prior to depositing electrodes and electrolyte.

Figure 10:
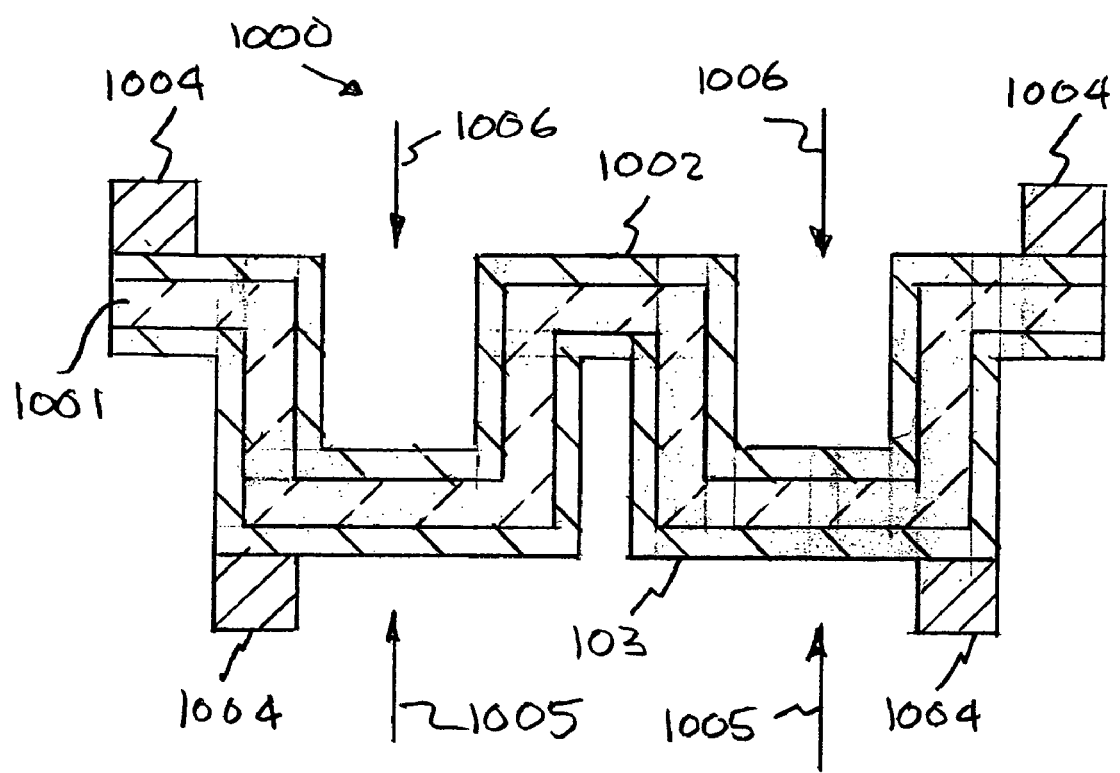
FIG. 10 illustrates a non-planar phosphoric acid fuel cell configuration using a porous ceramic or insulator electrolyte support.

Referring now to FIG. 10, another embodiment of a PAFC constructed in accordance with the present invention is illustrated. The PAFC is identified generally by the reference numeral 1000. The PAFC 1000 includes the following structural components: porous electrolyte support 1001, cathode 1002, anode 1003, current carrying bus or manifold 1004, fuel 1005, and air or oxygen 1006.

The PAFC 1000 is formed in the shape illustrated in silicon or aluminum through approaches such as etching or machining, then making the structure porous to create a continuous layer that holds the shape of the initial structure as shown in FIG. 10. Once the porous support structure is formed, the phosphoric acid electrolyte and electrodes are deposited on opposing sides of the porous support structure. The PAFC 1000 is a non-planar phosphoric acid fuel cell configuration using a porous ceramic or insulator electrolyte support. The membrane can be configured in any shape as long as opposing electrodes and surfaces are isolated by seals to only air or hydrogen flows to the electrode.

In one embodiment very deep channels are formed on opposing surfaces of a substrate. The substrate may be silicon or aluminum, and the channels can be up to several millimeters deep, and as narrow as a few microns. The remaining walls between adjacent microchannels may be 10-100 µm wide. The walls are then made to be porous by anodic, electrochemical, or other etching techniques. Once the structure has been made completely porous, an electrolyte is deposited into the porous support structure through techniques such as wicking, or flowing the electrolyte through the open microchannels.

Figure 11:
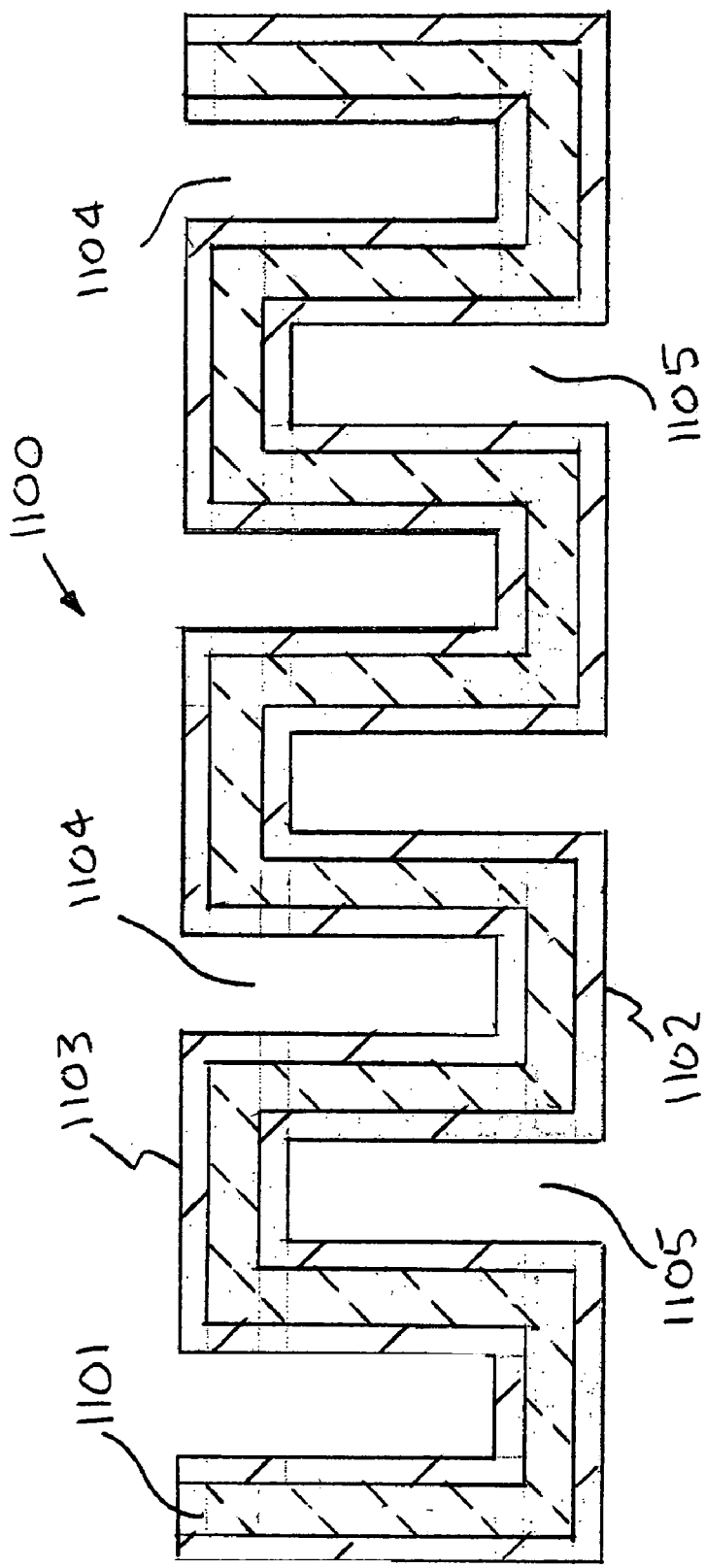
FIG. 11 illustrates another embodiment of a non-planar phosphoric acid fuel cell configuration using a porous ceramic or insulator electrolyte support.

Referring now to FIG. 11, another embodiment of a PAFC constructed in accordance with the present invention is illustrated. The PAFC is identified generally by the reference numeral 1100. The PAFC 1100 includes the following structural components: porous electrolyte support 1101, fuel electrode 1102, air electrode 1103, upper microchannel 1104, and lower microchannel 1005. The PAFC 1100 is a non-planar phosphoric acid fuel cell configuration using porous ceramic or insulator electrolyte support. The membrane can be configured in any shape as long as opposing electrodes and surfaces are isolated by seals to only air or hydrogen flows to the electrode.

The PAFC 1100 is produced utilizing different methods of manufacture, particularly MicroElectroMechanical Systems (MEMS) technology. The porous electrolyte support 1101 may be silicon or aluminum, and the channels 1004 and 10005 can be up to several millimeters deep, and as narrow as a few microns. The remaining walls between adjacent microchannels may be 10-100 µm wide. The walls are then made to be porous by anodic, electrochemical, or other etching techniques. Once the structure has been made completely porous, an electrolyte is deposited into the porous support structure through techniques such as wicking, or flowing the electrolyte through the open microchannels. Air flows along the microchannels 1104 and 1105 for higher effective surface area.

Figure 12:
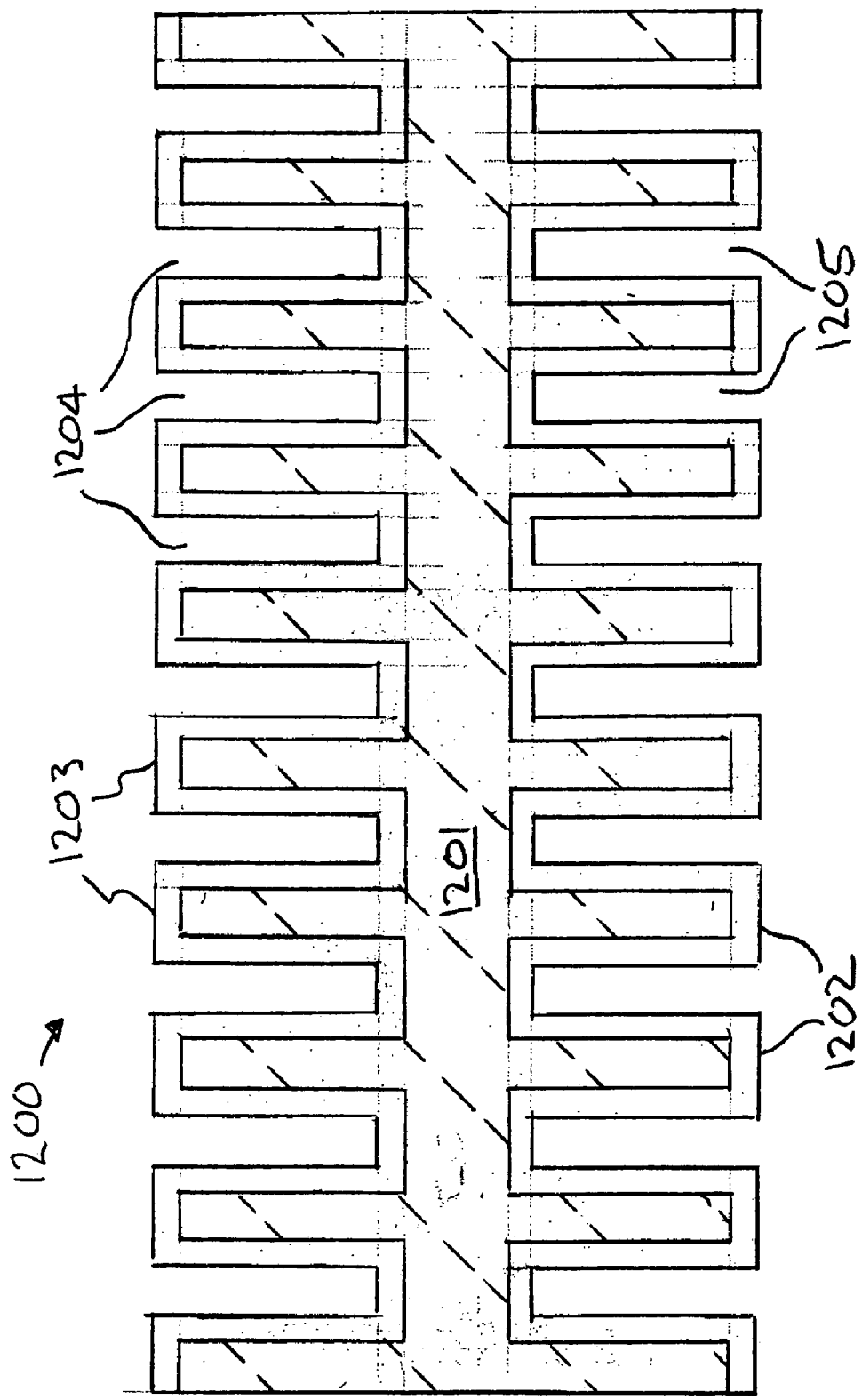
FIG. 12 illustrates another embodiment of a PAFC construted in accordance with the present invention.

Referring now to FIG. 12, another embodiment of a PAFC constructed in accordance with the present invention is illustrated. The PAFC is identified generally by the reference numeral 1200. The PAFC 1200 includes the following structural components: porous electrolyte support 1201, fuel electrode 1202, air electrode 1203, upper microchannel 1204, and lower microchannel 1005. The PAFC 1200 is a non-planar phosphoric acid fuel cell configuration using porous ceramic or insulator electrolyte support. The membrane can be configured in any shape as long as opposing electrodes and surfaces are isolated by seals to only air or hydrogen flows to the electrode.

The PAFC 1200 is produced utilizing different methods of manufacture, particularly MicroElectroMechanical Systems (MEMS) technology. Electrodes are then deposited on each side of the porous electrolyte membrane 1201, forming a very high electrode surface as shown in FIG. 12. The porous electrolyte support 1201 may be silicon or aluminum, and the channels 1004 and 10005 can be up to several millimeters deep, and as narrow as a few microns. The remaining walls between adjacent microchannels may be 10-100 µm wide. The walls are then made to be porous by anodic, electrochemical, or other etching techniques. Once the structure has been made completely porous, an electrolyte is deposited into the porous support structure through techniques such as wicking, or flowing the electrolyte through the open microchannels, which then absorbs or wicks into the porous ridge structure. Air and fuel flows along the microchannels 1204 and 1205, respectively, for higher effective surface area.

Figure 13:
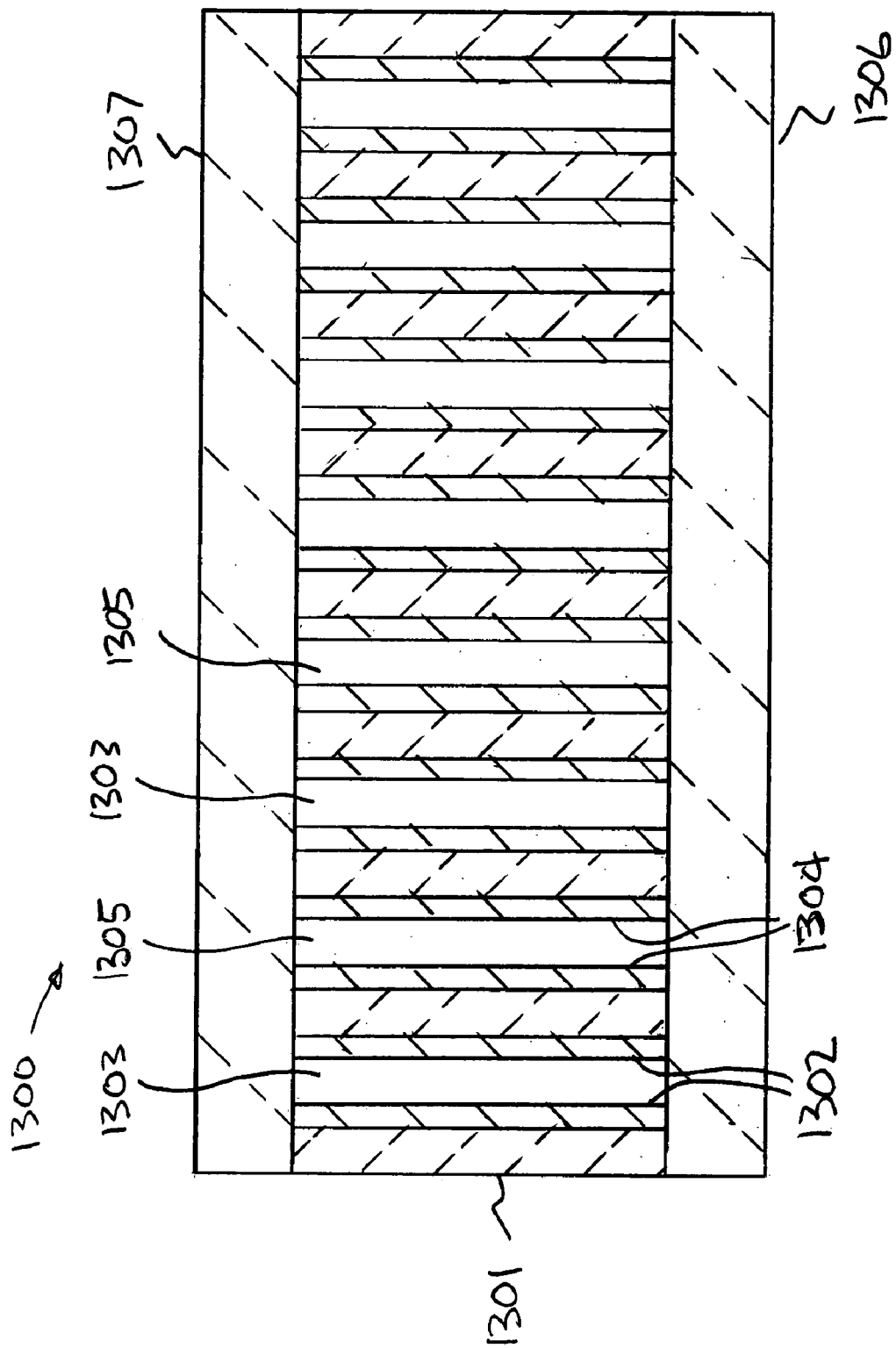
FIG. 13 illustrates another embodiment of a phosphoric acid fuel cell constructed in accordance with the present invention.

Referring now to FIG. 13, another embodiment of a PAFC constructed in accordance with the present invention is illustrated. The PAFC is identified generally by the reference numeral 1300. The PAFC 1300 includes the following structural components: porous electrolyte support 1301, fuel electrodes 1302, fuel microchannels 1303 containing fuel, air electrodes 1304, air microchannels 1305 containing air, bottom support 1206, and upper support 1307. The fuel microchannels 1303 containing fuel and the air microchannels 1305 containing air are positioned between the bottom support 1306 and the upper support 1307 in alternating fashion. The PAFC 1300 is produced utilizing different methods of manufacture, particularly MicroElectroMechanical Systems (MEMS) technology.

The PAFC 1300 is a microchannel phosphoric acid fuel cell having a microchannel array etched in a substrate that may have depths up to several millimeters and widths ranging from 10-1000 µm. The remaining walls are 1-500 µm wide. Once the channels are etched, the walls are made porous by an anodizing or electrochemical etch, or other etching techniques used to make materials porous. The bottom support layer 1306 and the upper support layer 1307 may be porous, but are primarily non-porous. The sidewalls are coated with electrodes. The electrode is not continuous over the top surface. This is accomplished by using photolithographic techniques or a "lift off" approach. The porous walls are filled with phosphoric acid. A non-porous cap layer is bonded to the top surface to form a continuous, sealed microchannel array. If air and fuel flow in adjacent and alternating microchannels, each separating wall represents a fuel cell, with the entire array representing a fuel cell stack. Electrical connections to alternating electrodes can be made at the end of the channels, and bussed accordingly for optimal power output.

The effective catalyst/electrode surface area can be substantially increased by (1) the addition of a platinum nanoparticle supported on carbon black powder or (2) the introduction of carbon nanotubes into and around the pores on the flow field/conductive side of the wafer prior to charging with phosphoric acid. In addition to carbon black powder, platinum on other conductive supports of high surface area to volume ratio would also function well in this regard. Other high surface area, porous electrode materials and compositions may be used, including the range of materials known to those familiar in the art. A Teflon™-containing emulsion can be added to the carbon/catalyst mixture and sintered to limit the intrusion of phosphoric acid into the catalyst layer. The Teflon™-containing emulsion is also expected to create a more favorable electrolyte/gas interface at the catalyst sites. The use of hydrophobic/hydrophilic mixtures of carbon particles may also provide a similar, useful partition of the gas and electrolyte domains, leading to improved performance.

It is to be noted that, with the exception of the optional Teflon™ treatment mentioned above, all of the configurations of this fuel cell contain no polymeric materials, and thus would be extremely radiation resistant. While other fuel cell types, such as molten carbonate or solid oxide fuel cells also contain no polymeric materials, they are rarely capable of operating at temperature ranges below 500° C., and never below 300° C. Thus, one of the advantages of this PAFC is that it is capable of operation in high radiation environments at convenient operating temperatures for methanol reforming. The operating temperature is not a prohibitively high temperature where thermal management and heat loss becomes detrimental for small (<100 W) fuel cell configurations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fuel cell apparatus, comprising:
   a porous electrolyte support, said porous electrolyte support having a microelectromechanical systems body with micropore channels,
   a phosphoric acid electrolyte reservoir,
   a phosphoric acid electrolyte in said phosphoric acid electrolyte reservoir and in said micropore channels of said porous electrolyte support,
   a cathode electrode contacting said microelectromechanical systems body with micropore channels and said phosphoric acid electrolyte,
   a cathode flow field formed by said micropore channels of said porous electrolyte support connecting said cathode electrode and said phosphoric acid electrolyte reservoir,
   an anode electrode contacting said microelectromechanical systems body with micropore channels and said phosphoric acid electrolyte, and
   an anode flow field formed by said micropore channels of said porous electrolyte support connecting said anode electrode and said phosphoric acid electrolyte reservoir.

2. The fuel cell apparatus of claim 1 wherein said porous electrolyte support comprises an aerogel.

3. The fuel cell apparatus of claim 1 wherein said porous electrolyte support is serpentine to increase overall surface area of the electrode and wherein said micropore channels have a width within the range of 10-1000 μm.

4. A fuel cell apparatus, comprising:

porous electrolyte support means for containing an electrolyte, said porous electrolyte support means having a microelectromechanical systems body with micropore channels, a phosphoric acid electrolyte reservoir, a phosphoric acid electrolyte in said phosphoric acid electrolyte reservoir and in said micropore channels of said porous electrolyte support means, a cathode electrode contacting said microelectromechanical systems body with micropore channels and said phosphoric acid electrolyte, a cathode flow field formed by said micropore channels of said porous electrolyte support means connecting said cathode electrode and said phosphoric acid electrolyte reservoir, an anode electrode contacting said microelectromechanical systems body with micropore channels and said phosphoric acid electrolyte, and an anode flow field formed by said micropore channels of said porous electrolyte support means connecting said anode electrode and said phosphoric acid electrolyte reservoir.

5. The fuel cell apparatus of claim 4 wherein said porous electrolyte support means comprises an aerogel.

* * * * *